United States Patent

[11] 3,633,185

[72] Inventor Irynej Danylchuk
Morris Plains, N.J.

[21] Appl. No. 39,581
[22] Filed May 22, 1970
[45] Patented Jan. 4, 1972
[73] Assignee Bell Telephone Laboratories, Incorporated
Murray Hill, Berkeley Heights, N.J.

[54] SINGLE-WALL DOMAIN GENERATOR
5 Claims, 7 Drawing Figs.

[52] U.S. Cl. .......... 340/174 TF,
340/174 SR, 340/174 YC, 340/174 CB
[51] Int. Cl. .......... G11c 21/00,
G11c 11/14
[50] Field of Search .......... 340/174
TF, 174 SR

[56] References Cited
UNITED STATES PATENTS
3,555,527 2/1971 Perneski .......... 340/174 TF

*Primary Examiner*—James W. Moffitt
*Attorneys*—R. J. Guenther and Kenneth B. Hamlin

ABSTRACT: A magnetically soft overlay element on a material in which single-wall domains can be moved is designed to generate single-wall domains in response to a magnetic field reorienting in the plane of the material. An auxiliary overlay element is positioned with respect to the generator to allow domain interaction to enhance the generator margins.

INVENTOR
I. DANYLCHUK
BY Herbert M. Shapiro
ATTORNEY

SINGLE-WALL DOMAIN GENERATOR

1. Field of the Invention

This invention relates to magnetic memory arrangements and, more particularly, to such arrangements in which patterns of single-wall domains representative of information are moved in a magnetic medium.

2. Background of the Invention

Single-wall domains are magnetic domains encompassed by a single domain wall which closes on itself in the plane of the medium in which it moves. Such a domain is a stable, self-contained entity free to move anywhere in the plane of the medium in response to offset attracting magnetic fields (viz, gradients).

Magnetic fields are often provided in such arrangements by an array of conductors pulsed individually by external drivers. The shape of the conductors is dictated by the shape of the domain and by the material parameters. Most materials suitable for the movement of single-wall domains exhibit a preferred direction of magnetization normal to the plane of movement and are, for all practical purposes, magnetically isotropic in the plane. Conductors suitable for domain movement in such materials conveniently are shaped as conductor loops providing magnetic fields in first and second directions along an axis also normal to the plane. By pulsing a succession of conductors of the array consecutively offset from the position of a domain, domain movement is realized. In practice, the conductors are interconnected serially in three sets to provide a familiar three-phase shift register operation. The use of single-wall domains in such a manner is disclosed in U.S. Pat. Nos. 3,460,116 of A. H. Bobeck, U. F. Gianola, R. C. Sherwood, and W. Shockley, issued Aug. 5, 1969.

An alternative propagation technique involves the generation of a reorienting field in the plane of movement of domains. This technique employs an overlay of magnetically soft elements aligned to respond to a uniform in-plane field to generate changing magnetic pole patterns which attract domains to consecutive positions in a propagation channel as that field reorients. One such arrangement employing bar- and T-shaped elements operates in response to a rotating in-plane field as disclosed in copending application Ser. No. 732,705, filed May 28, 1968 for A. H. Bobeck, and now U.S. Pat. No. 3,534,347.

The latter propagation technique is particularly useful for large-capacity sequential memories such as disk files. In arrangements of this type, no electrical conductors are necessary except where a specific function is to be implemented locally and perhaps at output and input positions. But advantage may be taken of the geometry of the magnetic overlay to build in certain functional operations without conductors. For example, a nonconductor domain generator which avoids the necessity for electrical conductors is shown in copending application Ser. No. 756,210, filed Aug. 29, 1968 for A. J. Perneski and now U.S. Pat. No. 3,555,527.

It has been found that nonconductor domain generators have operating margins which are narrower than the operating margins of, for example, bar- and T-shaped overlay circuits to which they supply domains for propagation. Further, it has been found that the operating margins can be enhanced by positioning an electrical conductor for generating a cutting field at an appropriate time in the cycle of an in-plane field for cooperating in the generation of domains. Although the last-mentioned arrangements operate with lower drives than conductor generators, it is desirable to eliminate electrical conductors from the generator altogether to achieve a relatively low-cost configuration.

BRIEF DESCRIPTION OF THE INVENTION

In accordance with the present invention, first and second overlay elements are disposed in close proximity to one another on the surface of a material in which single-wall domains can be moved. Each element comprises a magnetically soft material and has coupled to its periphery a domain which moves thereabout as an in-plane field reorients. One element has a geometry to stretch a seed domain while the other functions to move a domain into a position to exert a repelling force to divide the stretched domain. Operating margins in excess of those exhibited by bar- and T-shaped propagating circuits have been observed.

DETAILED DESCRIPTION

Figure 1:
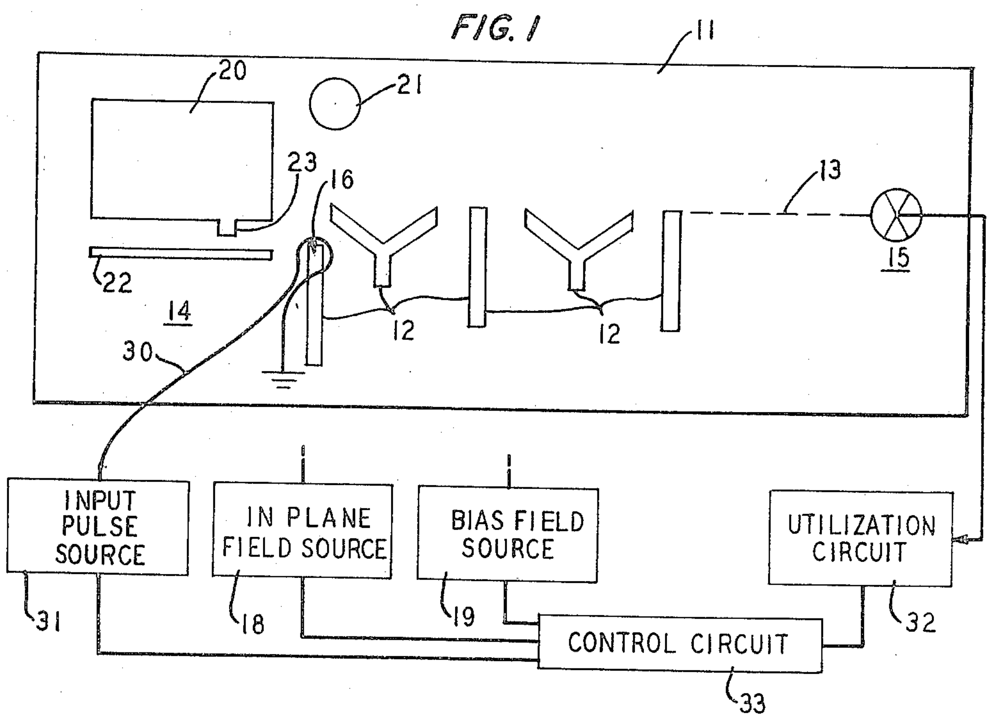
FIG. 1 is a schematic illustration of a domain propagation arrangement in accordance with this invention.

FIG. 1 shows a domain propagation device comprising a sheet or slice 11 of material in which single-wall domains can be moved. A repetitive pattern of Y-shaped and bar overlap elements 12 define a shift register channel 13 between input and output positions 14 and 15 respectively. In accordance with this invention, the input functions to provide a domain at position in FIG. 1 for propagation along channel 13. Both the input and the propagation arrangements operate in response to a rotating in-plane field supplied by familiar means represented by block 18 in the figure. Domain size is held constant conveniently by a bias field source, which may be a permanent magnet, represented by block 19 in the figure.

The operation of the propagation channel in response to a rotating in-plane field is entirely analogous to that of a bar- and T-shaped overlay propagation channel noted above and is not discussed in detail. The supply of domains by the input arrangement in accordance with this invention, on the other hand, is now discussed in detail in connection with the sequence of FIGS. 2A through 2E followed by a discussion of the operating margins of the generator in connection with the graph of FIG. 3.

Figure 2A:
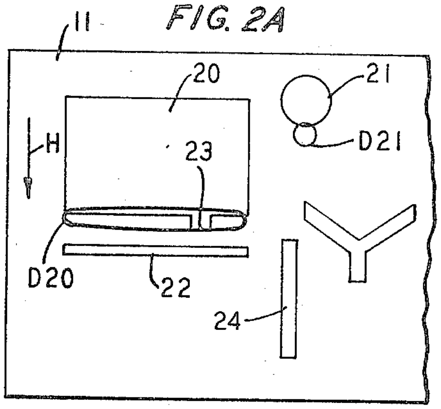
FIGS. 2A, 2B, 2C, 2D, and 2E are schematic illustrations of portions of the arrangement of FIG. 1 showing a generator in accordance with this invention during operation.

FIG. 2A shows a plurality of magnetically soft elements, typically low coercive force permalloy, which comprise the generator of input 14 of FIG. 1. In addition, the figure shows the leftmost elements of channel 13 as shown in FIG. 1. The generator comprises specifically overlay elements 20, 21, and 22. Each of elements 20 and 21 includes a "seed" domain, always present and always moving about the periphery of those elements as the in-plane field rotates.

The domains associated with overlays 20 and 21 are identified as D20 and D21 respectively. Domain D20 assumes an elongated shape in FIG. 2A because of the spread of attracting magnetic poles along the bottom of element 20 when the in-plane field is oriented downward as indicated by arrow H. This assumes a convention where attracting poles are associated with the positive direction of the field. Domain D21 retains a circular shape as is well understood.

Figure 2B:
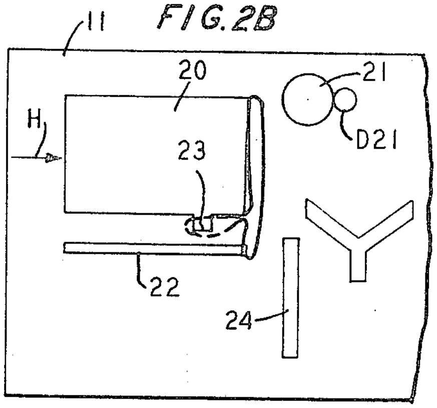

The sequence of figures assumes an in-plane field rotating counterclockwise. The sequence is initiated with the field directed downward as mentioned in connection with FIG. 2A. In FIG. 2B the field is directed to the right as indicated by arrow H. Domain D20, bulged downward by the presence of an extension 23 on element 20, is firmly attracted to the right end of elements 22 and 20. The exact shape of the domain at extension 23 is not known but is indicated by broken lines to show a change in the domain geometry when the field reorients from alignment with extension 23 to alignment with element 22 finally causing adherence to the right end of element 22. It is to be understood that regardless of the actual geometry, the domain is in a stretched condition when the field is oriented as indicated in FIG. 2B. Domain D21 is shown at the right edge of element 21.

Figure 2C:
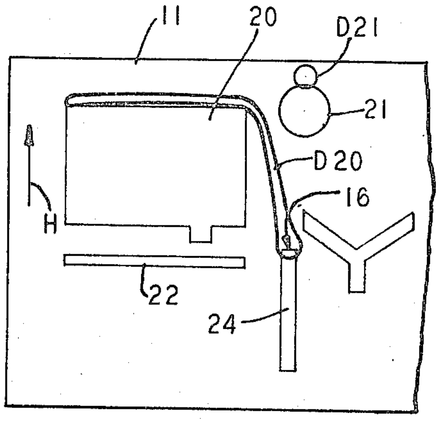

FIG. 2C shows the field (arrow H) directed upward. Domain D20 is now stretched between strong poles at the top of element 20 and the top of element 24. Domain D21 is shown at the top of element 21 at this juncture.

Figures 2D, 2E, 3:
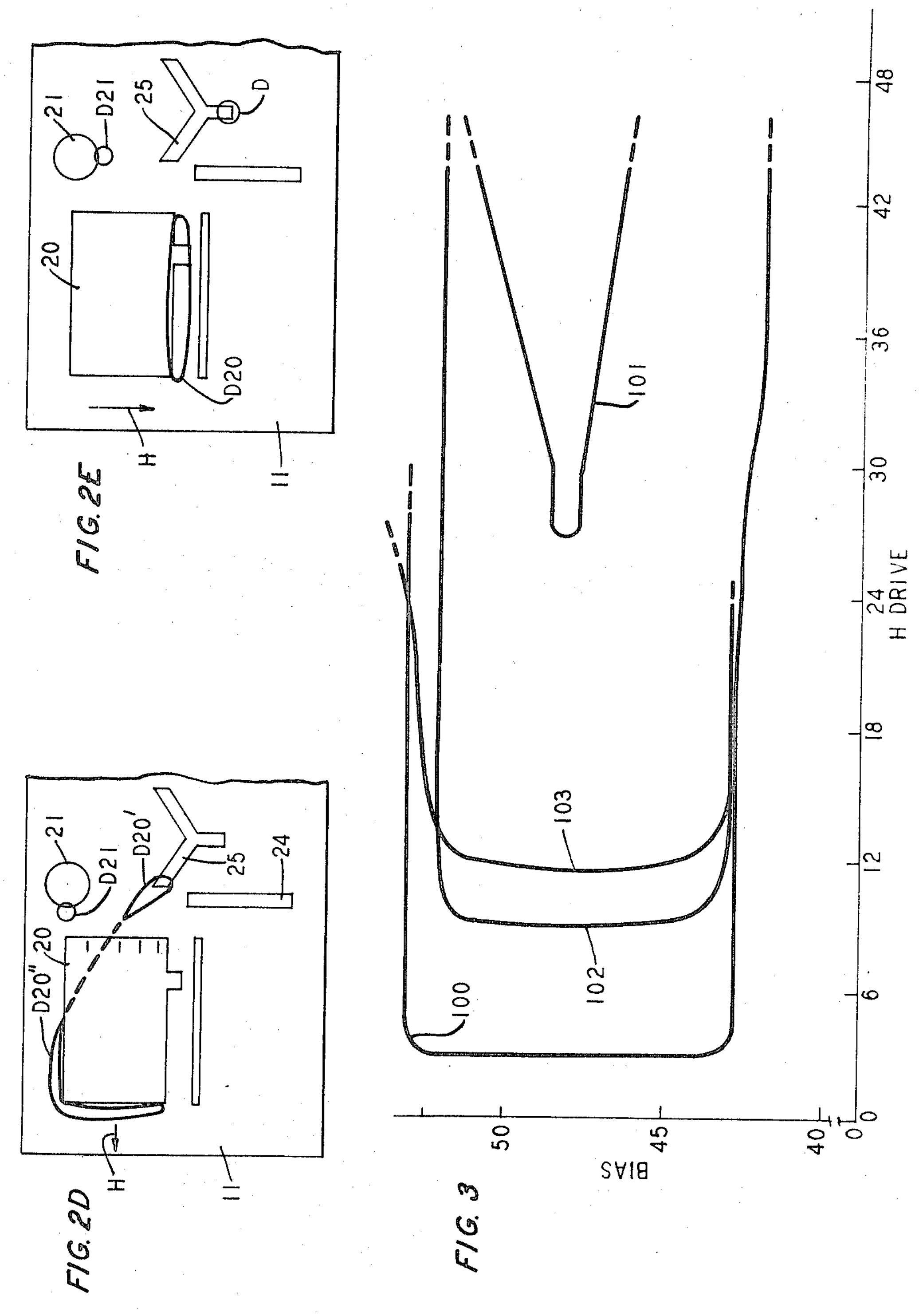
FIG. 3 is a graph showing, inter alia, the operating margins of a domain generator in accordance with this arrangement and the propagating circuit to which it supplies domains.

FIG. 2D shows the field further rotated counterclockwise to the left as indicated by the arrow H. Domain D20 is now stretched between a strong pole at the top left of element 25 and the left of element 20. But domain D21 is now moved to the left of element 21 into a position to apply to domain D20 the repelling force known to exist between (like poles) two domains. In addition, the right side of element 20 exhibits repelling poles also as indicated by the minus signs there. At this juncture in the in-plane cycle, domain D2 divides into two domains represented at D20′ and D20″ shown connected by a broken line. The exact geometry of the domains has not yet been established.

FIG. 2E shows arrow H again pointing downward in the orientation shown in FIG. 2A. Once again, seed domains D20 and D21 occupy positions previously occupied thereby in FIG. 2A. But now a domain, designated D is moving to the right along channel 13 and is associated with the center portion of element 25 in FIG. 2E.

We have now described domain generation which occurs for each cycle of the in-plane field unless inhibited. The inhibition of the domain generation function is accomplished conveniently by neutralizing the accumulation of attracting poles at position 16 of element 24 shown in FIG. 1 and FIG. 2C. This neutralization may be accomplished by a conductor 30 which couples position 16 and is connected between an input pulse source 31 and ground as shown in FIG. 1. A current applied to conductor 30 by source 31 functions to generate a field which, in essence, increases the bias field locally thus neutralizing the bias field perturbation introduced by the poles in the overlay elements. The pulse necessary in this instance is small compared to that necessary for cutting. Alternatively, the attracting poles may be neutralized by reducing the in-plane field when it is in the proper orientation (FIG. 2C). Of course, the presence of such an input pulse (or in-plane field reduction) produces an absence of a domain representing a binary zero for propagation. A domain pattern representing binary ones and zeros generated in this manner is moved along channel 13 by the rotating in-plane field to an output position designated 15 and represented by an encircled X in FIG. 1.

The detection of domains at 15 is well understood in the art. One suitable arrangement is a modified Hall effect device disclosed in copending application Ser. No. 882,900, filed Dec. 8, 1969 for W. Strauss. Alternatively, other electrical or optical detection is suitable. Such detection means are represented in FIG. 1 by block 32 designated "utilization circuit."

Sources 18, 19, and 31 and circuit 32 are connected to a control circuit 33 for synchronization and control.

As was stated hereinbefore, there are a number of alternatives for effecting domain generation. Some call solely for a magnetically soft overlay of a geometry to respond to a reorienting field. Some employ an electrical conductor in addition to the magnetically soft material for dividing a domain stretched by such an overlay. FIG. 3 is a graph in which the operating characteristics for such generator circuits are plotted along with the characteristics for a circuit in accordance with this invention and the characteristics of a familiar T-shaped and bar propagation circuit in order to provide a comparison of the margins for the various circuits.

The abscissa of the graph of FIG. 3 is in oersteds of drive field across a domain supplied by the in-plane field. The ordinate is in oersteds of bias field. The T-shaped and bar propagation circuit typically operates over a bias range of from about 43 to 53 oersteds of bias field and in excess of 50 oersteds of drive field as indicated by curve 100. The "classical" permalloy overlay of the above-mentioned copending application of A. J. Perneski operates typically with drive fields of about 27 oersteds and above within a bias field range between about 47 to 48 oersteds which increased slightly for higher drive fields as shown by curve 101 in FIG. 3.

Curves 102 and 103 represent the characteristics of a conductor assisted overlay generator of a type disclosed for example in copending application Ser. No. 882,137, filed Dec. 4, 1969 for P. I. Bonyhard, and of an overlay generator in accordance with this invention. Both of these circuits operate in a bias range of between 43 and 53 oersteds at over about 12-oersteds drive field.

In one specific embodiment in accordance with this invention, domains 2 mils in diameter were moved in a slice of samarium terbium orthoferrite ($Sm_{0.5}Tb_{0.45}Fe_2O_3$) 100 ×75 ×2 mils thick. A generator of the type shown in FIG. 1 had the dimensions 10 ×10 and 4 mils diameter for the two overlay elements. Domains were generated and propagated at a 1 kHz. rate with bias fields ranging from 43 oersteds to 53 oersteds and in-plane fields ranging from 12 oersteds to 42 oersteds.

What has been described is considered only illustrative of the principles of this invention. Therefore, various modifications therein may be devised by those skilled in the art within the scope and spirit of this invention.

What is claimed is:

1. A magnetic domain generator comprising a sheet of material in which single-wall domains can be moved, a magnetically soft overlay adjacent said sheet, said overlay comprising elements having geometries to generate changing magnetic pole patterns in response to a reorienting magnetic field in the plane of said sheet, means for generating said reorienting magnetic field, first and one of a plurality of said elements having shapes and being disposed to provide poles moving in different directions in a manner to attract and thus stretch a domain in response to said reorienting field, a third of said elements having a geometry and being disposed such that a domain moving about the periphery thereof in response to said reorienting field interacts in a manner to divide a domain stretched in response to said field between said first and said first one of said second elements.

2. A generator in accordance with claim 1 wherein said means for generating said reorienting field comprises means for generating a magnetic field rotating in the plane of said sheet.

3. A generator in accordance with claim 2 also comprising means for inhibiting the poles of a first of said second element in a manner to prevent the stretching of a domain.

4. A generator in accordance with claim 3 wherein said means for inhibiting comprise means for generating a localized magnetic field.

5. A generator in accordance with claim 3 wherein each of said first and third elements has a single wall domain permanently associated with the peripheries thereof.

* * * * *